March 1, 1960 M. J. IRLAND ET AL 2,927,245
MOTOR VEHICLE HEADLAMP SYSTEM
Filed Feb. 7, 1957 5 Sheets-Sheet 1

M.J. IRLAND
V.L. LINDBERG
INVENTOR.

BY E. C. McRae
J. R. Faulkner
J. H. Oster
ATTORNEYS

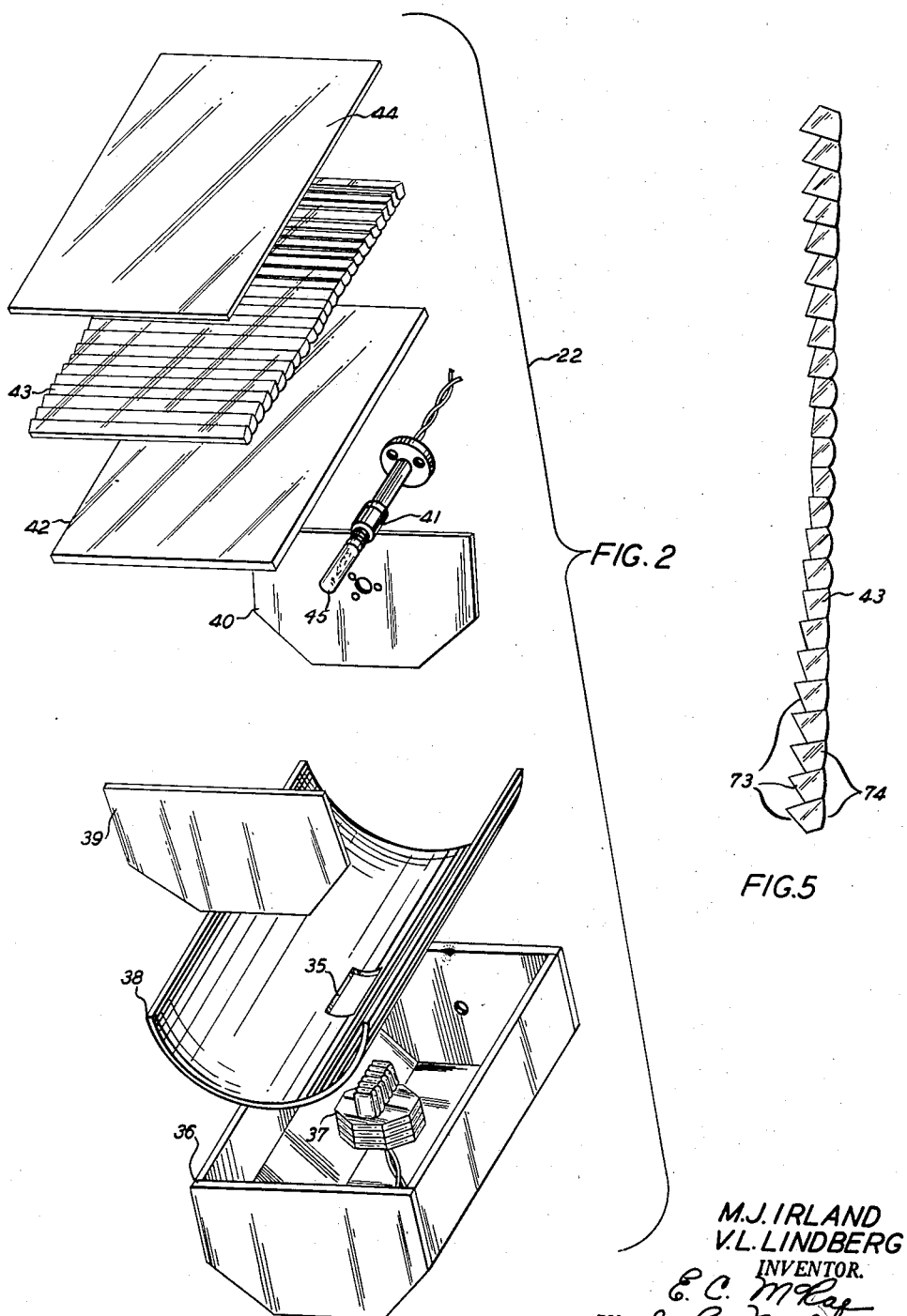

March 1, 1960  M. J. IRLAND ET AL  2,927,245
MOTOR VEHICLE HEADLAMP SYSTEM
Filed Feb. 7, 1957  5 Sheets-Sheet 3

M.J. IRLAND
V.L. LINDBERG
INVENTOR.

BY E. C. McRae
J. P. Faulkner
J. H. Oster
ATTORNEYS

March 1, 1960 M. J. IRLAND ET AL 2,927,245
MOTOR VEHICLE HEADLAMP SYSTEM
Filed Feb. 7, 1957 5 Sheets-Sheet 4

M.J. IRLAND
V.L. LINDBERG
INVENTOR.

BY E. C. McRae
J. R. Faulkner
D. H. Oster
ATTORNEYS

March 1, 1960 M. J. IRLAND ET AL 2,927,245
MOTOR VEHICLE HEADLAMP SYSTEM
Filed Feb. 7, 1957 5 Sheets-Sheet 5

M. J. IRLAND
V. L. LINDBERG
INVENTOR.

BY E. C. McRae
J. R. Faulkner
J. H. Oster

ATTORNEYS

United States Patent Office
2,927,245
Patented Mar. 1, 1960

2,927,245

MOTOR VEHICLE HEADLAMP SYSTEM

Max J. Irland, Dearborn, and Victor L. Lindberg, Northville, Mich., assignors to Ford Motor Company, Dearborn, Mich., a corporation of Delaware Application February 7, 1957, Serial No. 638,752

8 Claims. (Cl. 315—83)

This invention relates to motor vehicle lighting systems and more particularly to a system which is designed to combat glare and resulting blindness from oncoming vehicle lights, whether or not such vehicles are also equipped with any special anti-glare devices.

In the embodiment of the invention described below there is provided a set of headlights capable of emitting a powerful monochromatic polarized light to be used in conjunction with one, both, or neither of two unique filters provided depending upon the presence of oncoming motor vehicles and the type of headlamps with which said oncoming vehicles are equipped. If no vehicle is sensed by the assembly of this invention, no filter is placed before the driver's eyes. If an oncoming vehicle with similar equipment is sensed, then a polarized filter is automatically positioned in front of the driver's eyes, allowing him to see the light from his own headlights as reflected from the road and objects thereon and adjacent thereto, but blocking almost completely the light from the oncoming vehicle's headlights. If an oncoming motor vehicle is sensed with a lighting assembly other than one similar to the operator's, then a monochromatic filter is automatically positioned before the operator's eyes so that he may receive the reflected light from his own headlights while blocking all of the light from the oncoming vehicle except that portion in the narrow range passed by his filter. If both monochromatic and white light are sensed, then both filters will be placed before the driver's eyes. In addition to the monochromatic viewing filter used by the driver in the passenger compartment, a second monochromatic filter may be used in conjunction with the light source of this invention thereby insuring the emission of the desired band of wave lengths.

The driver's viewing filter used in the passenger compartment is inclined approximately 15 to 45 degrees to a vertical plane so that it will not reflect light from the rear or sides of the vehicle into the driver's eyes. This feature of the invention is described more completely in application S.N. 403,978, now abandoned, to Irland assigned to the assignee of this application. This viewing filter is advantageously a multilayer dielectric interference filter. Since the amount of a particular wave length of light passed by an interference filter varies with the angle of the light incident to the filter, this invention has provided a filter which has the proper variation over its surface of the thickness of each of its several layers to admit the maximum amount of the desired wave length to the driver's eye.

This invention also provides for a unique design for the above-mentioned second monochromatic filter whereby the maximum amount of light is allowed to pass from the headlight source. This may be accomplished in one of a number of ways as will be more clearly described hereinbelow.

Also used in conjunction with the monochromatic source is a multiple sectioned lens or a lens with multiple vertical strips to provide a horizontal fan of light which covers the road ahead with the strongest rays being projected directly ahead, while rays of lesser intensity are fanned to either side.

In addition, this invention provides an electrical system having the necessary voltage and starting means required for arc lamps which voltage may be alternating or direct and in the embodiment described is alternating, while still providing direct current at comparatively low voltage to the rest of the motor vehicle electrical system. This electrical system will also position before the driver's eyes a polarizing filter, a monochromatic filter, both filters, or no filter at all, depending on whether there are one or more oncoming vehicles with similar systems, conventional systems of lighting, both systems, or no oncoming vehicle at all, respectively. In addition, this system automatically deflects the beam of the vehicle lights downward for all oncoming vehicles.

Further, through the means of a uniquely designed electrode in combination with an electromagnet, the arc lamp aforementioned can have its rays downwardly focused, thereby providing an arrangement for depressing the beam.

These and other objects will become more apparent when a detailed description of an embodiment of this invention is considered in which the following drawings are illustrative:

Figure 2 is an exploded view of a lamp of this invention showing the electromagnet for downwardly deflecting the beam, polarizing filter, and colored glass filter, the lens, reflectors, and a cover;

Figure 4 shows a further enlarged view of the arc electrodes while

Figure 5 shows a plan view of a lens used in this invention;

Figure 1:
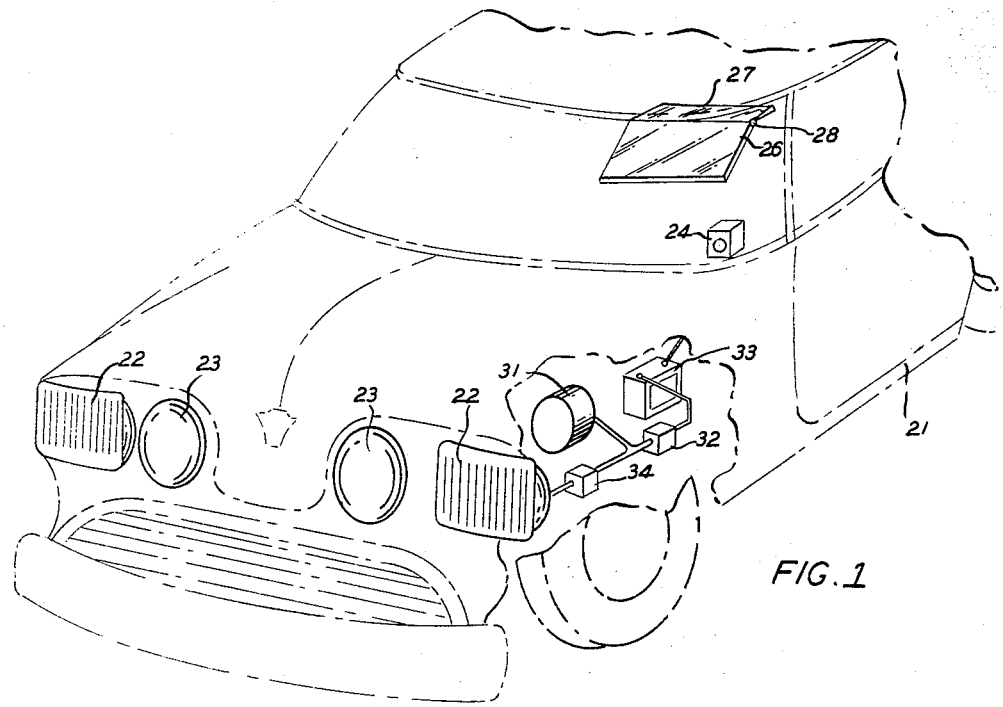
Figure 1 shows a perspective, partially cutaway vehicle equipped with an embodiment of this invention.

Shown in Figure 1 is automobile 21 having two sets of headlights, a polarized, filtered arc light set 22 and conventional incandescent light set 23 which may be placed inwardly thereof. Also shown are driver's filters 26 and 27 which are adjustably mounted within the passenger compartment so that the appropriate filter may be automatically positioned in the operator's line of vision if conditions require. As shown in the drawings these filters are adapted to be pivoted about a common axis 28; however, it is to be understood that any mechanical arrangement by which these filters may be precisely positioned in and removed from the driver's line of sight may be used. Filter 26 is a polarizing filter, while filter 27 is a monochromatic interference filter adapted to filter out all but a selected wave length from a mercury arc lamp. Sensing box 24 is positioned to receive light signals from oncoming vehicles and automatically selects and positions either filter 26, 27, both, or neither. In the cutaway portion is seen alternating current generator 31 which is connected through rectifier unit 32 to battery 33 which supplies direct current for the rest of the motor vehicle electrical circuit. Connected between generator 31 and lamp set 22, is current regulator 34. Sensor 24 is also connected to lamps 22 and upon receiving an oncoming light signal of a certain intensity, but without regard to the wave lengths, will automatically deflect the beams of headlight set 22 downwardly. In this embodiment headlight set 23 is intended for use only in town driving or when the vehicle's engine is stopped, while headlight set 22 may be manually switched into the circuit by the operator for highway driving. In this case, headlight set 23 will automatically continue to function until set 22 has reached substantially full brilliance, and will then be automatically switched off.

A mercury arc is ideally suited to be the light source for headlamp 22 because it heats up to operating temperatures relatively quickly and a large fraction of the luminous flux of this arc is concentrated in the vicinity of one wave length (5461 Angstroms) so that the light emitted by lamp 22 may be made monochromatic by employing a filter transparent at 5461 A. Other types of light sources were investigated and several were found to be superior to the mercury arc in some respects as seen in Table I. However, this table also indicates that only the mercury arc has properties which may be rated "good" in all categories necessary for vehicle installations.

Shown in Figure 2 is an exploded view of one embodiment of lamps 22, making use of a mercury arc as light source. Inserted in housing 36 is electromagnet 37 which extends through slot 35 in reflector 38. Reflector sides 39 and 40 fit along the side of housing 36 and aid in illuminating the sides of the road. Side 40 has a suitable aperture for the placement of arc and bulb assembly 41. Adjacent the front ends of sides 39 and 40 is polarizing filter 44 which has a direction of polarization of about 45 degrees to vertical, and lens 43 which creates a horizontal fan of rays with the strongest rays being at the center, and glass filter 42 which removes from the light of a mercury arc the objectionable yellow light having wave lengths in the vicinity of 57770 A. Didymium glass may be advantageously employed as this filter.

about its longitudinal axis at a constant speed thereby insuring that each layer will be of uniform thickness on the cylindrical bulb wall. By forming the filter in this fashion about an axis of lamp 45 the light from arc 46 is most nearly normal to the interference filter thereby allowing all the light of the proper wave length to pass through the filter. On the other hand, any light which is initially reflected instead of transmitted will not be transmitted when it impinges upon the filter a second or subsequent time since it will strike the filter obliquely and will not be transmitted because the wave length transmitted by the filter is decreased an oblique incidence. Therefore, this filter will not tend to diffuse the light from the arc 46 so that the light beam reflected from reflector 38 in Figure 2 may be sharply focused. The mercury arc emits light of which the brightest component has a wave length of approximately 5461 Angstrom units; this light is further purified by interference filter 48 which has alternate layers of materials with a high index of refraction and low index of refraction as explained above. The filter in this embodiment is composed of eleven layers with the first five and last five having an optical thickness of ¼ wave length of the light that it is desired to pass, with the sixth layer, or center layer, having a thickness of ½ wave length of said light.

Figure 4A:
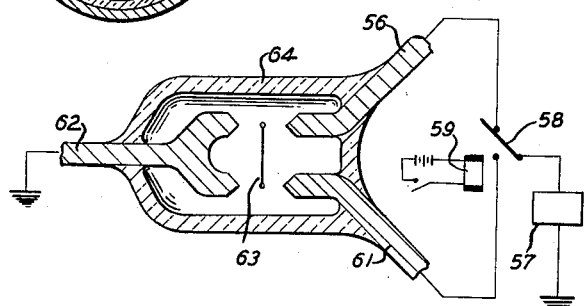
Figures 4a and 4b show another embodiment of the arc electrodes and beam depressing means.
Figure 4:
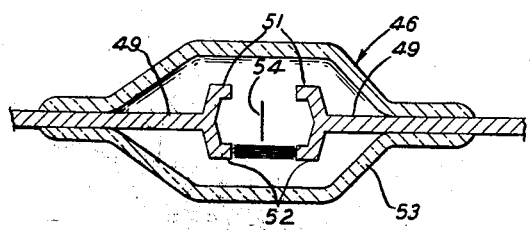

Figure 4 is an enlargement of mercury arc 46 showing two opposed electrodes 49, having upper arms 51 and lower arms 52. The arc is shown in Figure 4 between lower arms 52, but may be moved to upper arm 51 by electromagnet 37 in the manner described hereinbelow. Shifting the arc from the lower arms to the upper arms will cause the resulting reflected beam cast by reflector 38 (Figure 2) to be deflected downwardly. Quartz capsule 53 is designed to form an air tight seal about electrode 49 and the interior of capsule 53 is filled with mercury vapor at a suitable pressure according to usual practice. High-voltage restart electrode 54 is placed inside capsule 53 and will start either pair of electrodes as determined by magnet 37. In this embodiment the arc TABLE I
*Lamp characteristics*

| Type of Lamp | Natural Color | Filtering Requirements | Compactness | Visibility | Efficiency at One Wavelength | Temperature Sensitivity | Starting Time | Restarting Time |
|---|---|---|---|---|---|---|---|---|
| Sodium | Yellow | None | Poor | Very Good | Excellent | Poor | Poor | Poor. |
| Mercury (Low Pressure) | Greenish White | Moderate | do | Excellent | Good | Good | Good to Excellent. | Good to Excellent. |
| Neon | Orange-Red | do | Fair | Fair | Fair | do | Excellent | Excellent. |
| Filtered Incandescent | White | Severe | Excellent | Poor to Excellent. | Poor | Excellent | do | Do. |
| Helium | Yellow | Slight | Poor | Very Good | Good | Good | do | Do. |
| Thallium | Green | None | Fair | Excellent | Excellent | Poor | Poor | Poor. |
| Lithium | Red | do | Poor | Fair | do | do | do | Do. |
| Mercury (High Pressure) | Greenish White | Moderate | Good | Excellent | Very Good | Good | Good | Excellent. |

Figure 3:
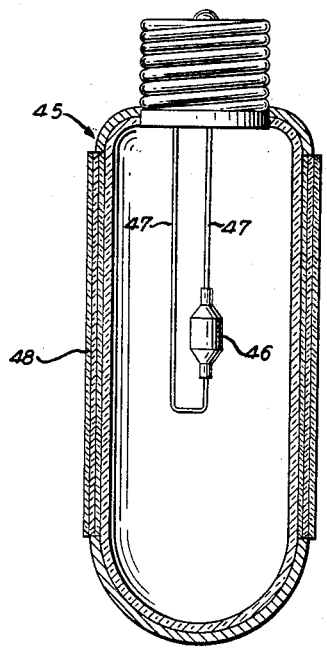
Figure 3 shows an enlarged sectioned view of the arc lamp with an alternative monochromatic form of filter.

In Figure 3 is shown a unitary arc, bulb and filter assembly in which the absorption filter 42 is replaced by an interference filter 48 deposited upon the glass envelope of the bulb 45 and transmits only light of wave length of 5461 A. Within the bulb 45 is mercury arc 46 which is supplied by electrical leads 47. The light from arc 46 is filtered to provide the necessary monochromatic light by the interference filter 48. This filter is composed of an odd number of dielectric layers, the middle one having an optical thickness of ½ wave length of the light desired to be transmitted (5461 A. if a mercury arc is used) and each of the remaining ones having an optical thickness of ¼ wave length. As is well known in the art, the interference filter is produced by deposition of alternate layers of dielectric materials, one having a high index of refraction and the other having a low index of refraction such as zinc sulfide and cryolite respectively. The layers of the filter are produced by depositing the dielectric through a narrow slit in an appropriate baffle positioned adjacent the bulb 45 which bulb is rotated between electrodes 49 is maintained by an alternating current, and magnet 37 is positioned relative to electrode 49 as shown in Figure 2 so that the alternating current to magnet 37 is in phase with the current supplied to electrode 49. An arc shift from one pair of arms to the other is accomplished by changing the polarity of magnet 37 thus exactly reversing its phase relationship to the electrode current.

A horizontal arc which may be changed by a switching and relay arrangement instead of an electromagnet may be provided with an assembly like that shown in Figure 4a. In this arrangement upper electrode 56 is connected to power source 57 through switch 58 until relay 59 is energized thereby breaking the circuit for upper electrode 56 and making it for lower electrode 61. Electrode 62, as may be seen, is in the circuit at all times, and also enclosed in quartz capsule 64 is restart electrode 63.

Figure 4B:
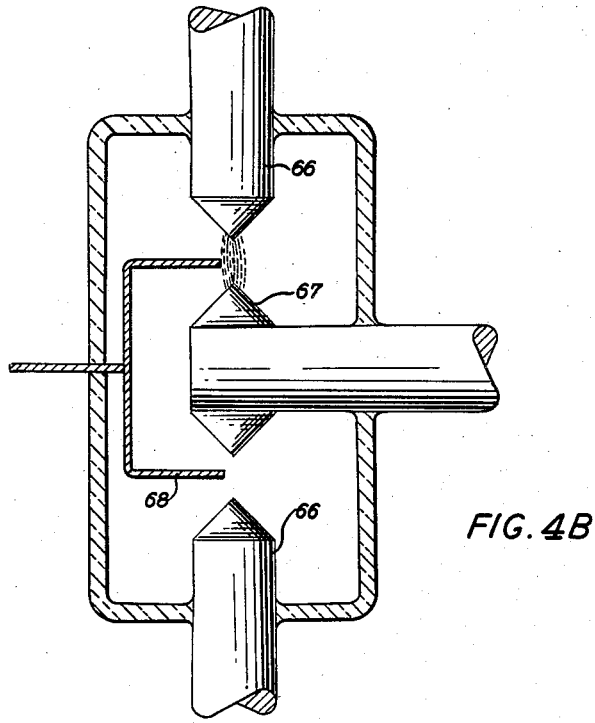

In Figure 4b is shown an arrangement for vertical electrodes 66, 67. In this embodiment restart electrode 68 has a bifurcated arm whereby this electrode may be used to initiate the discharge at the appropriate station as determined by magnet 37.

It is usually considered that the light is emitted from a point source in designing lens elements for incandescent sources. This may not always be done in the case of the design of a lens utilizing an arc source since the source may be several centimeters long. Therefore, in order to simulate the light distribution characteristics obtained with an ordinary automotive head lamp, a special lens must be used when an arc lamp of such length is employed.

At Figure 5 is seen a plan view of lens 43 showing the arrangement which provides a horizontal fan of light with the stronger rays being towards the center, the rays from the outer ends of the lens being fanned outwardly to provide "spill" light to illuminate the road sides. The lens is composed of a series of vertical strips. These strips may be made individually and cemented together or the whole lens may be cast or otherwise formed as a unit whichever is more convenient. The mercury arc is positioned to the right of lens 43 as seen in Figure 5 so that the light emitted from the arc lamp is normal to the central strips of the lens and becomes increasingly more oblique at each successive strip away from the center.

The arcuate surfaces 74 of the strips are such that the light rays incident on each strip would emerge from the head lamp essentially parallel. This is accomplished by forming the surfaces 74 of each of the strips as a portion of a cylindrical surface. The radii of these cylindrical surfaces are the greatest at the outermost strips while the radii of the more central strips are made progressively smaller. The surfaces 73 of the strips remote from the arc source are formed with progressively larger angles to the plane of the lens from the center to either outside strip. This results in light beam of uniform intensity but having little or no spill light to illuminate the edges of the roadway. To increase the amount of spill light, the angles of the plane faces 73 of certain of the strips remote from the central portion of the lens are decreased in such a way as to divert a portion of the uniform beam to either side. In this manner strips near the center focus the light in an intense forward beam while moving outwardly, the light is more diffused by some of the strips, thereby aiding in the desired effect of strong roadway lighting and broader, but less intense, shoulder lighting.

Figure 6:
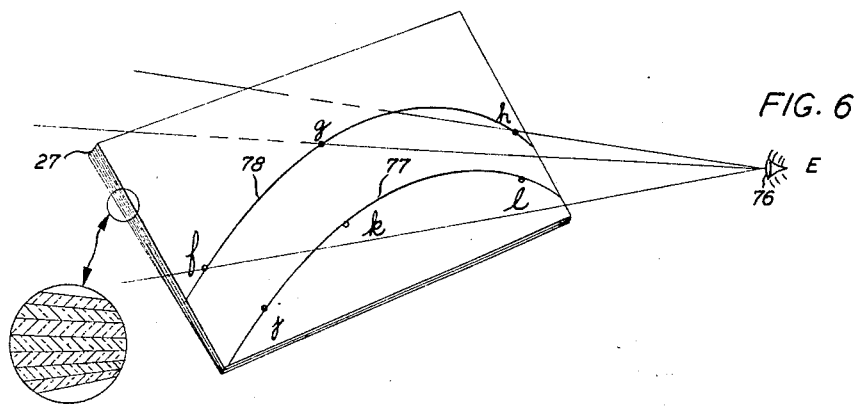
Figure 6 is a diagrammatic view showing the placement of the driver's interference filter along with an exaggerated cross section of the wedge-shaped characteristics of the layers of the filter.
Figure 6A:
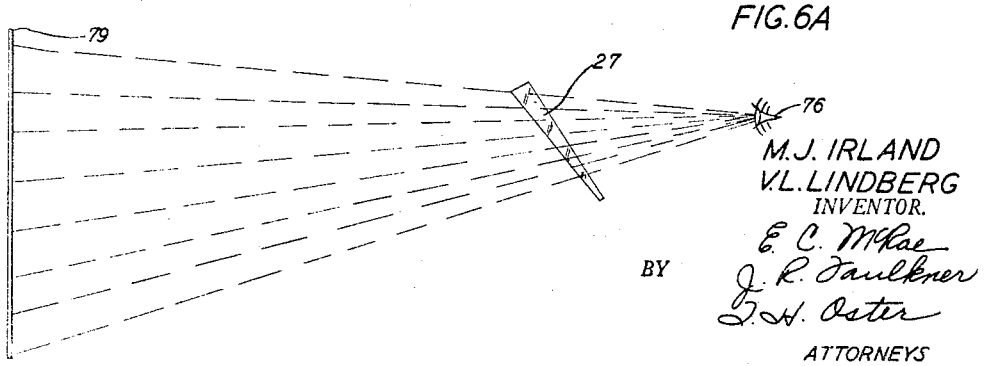
Figure 6a is a schematic view showing approximate relative placements of the driver's eye, a filter and a viewed object with several lines of sight shown in dashed lines.

In Figure 6 is shown a monochromatic interference filter 27 in which the variation in the thickness of the layers is greatly exaggerated. It is a part of this invention to make all points which are equidistant from the operator's eyes as are the points on each of the arcs 77, 78 of equal thickness and to make this thickness for each arc so that wave lengths entering the filter will travel through the same optical thickness of the filter for optimum operation of the filter. With the filter tilted in the position shown in Figure 6a, about 15 degrees from the vertical, it is seen that the line from the object 79 to the eye 76 is more nearly normal to filter 27 at the bottom than it is at the top. The filter layers are made physically thicker as the angle of incidence increases in order to allow the optical thickness of the filter to remain constant so that the maximum amount of the desired wave length, for example, 5461 Angstrom units, may be transmitted through the filter, thereby making objects most easily seen. This is because in an interference filter the phase shift of an impinging beam decreases as the angle of incidence increases and increasing the thickness of the layers of the filter will increase the phase shift. It should be kept in mind, however, that for best results points of equal thickness should be equidistant from the operator's eye. This means, of course, that the points of equal thickness should lie along arcs of a circle on the plane of the filter. That is to say at points $f$, $g$, and $h$ along arc 78, the thickness of the filter layers are the same and the thickness at points $j$, $k$, and $l$ are also equal but different from the thickness along arc 78.

Figure 7:
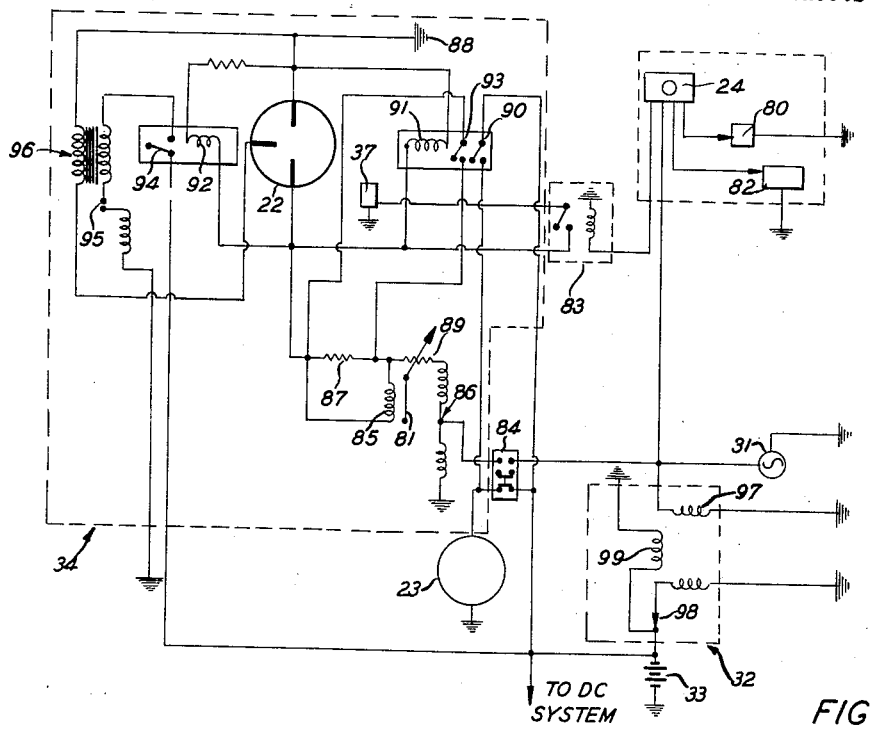
Figure 7 is a schematic diagram of the electrical system of this invention.

Figure 7 shows an electrical circuit adapted to be used with this invention, with alternating current generator 31 supplying all of the electrical needs to the electrical circuit including a low voltage direct current supply to battery 33 and thence to the vehicle direct current system, and the higher voltage alternating current intended for the mercury arc lamp. Light sensor 24 may be positioned where it may conveniently receive light from approaching vehicles; for example, above the dash as shown in Figure 1. When a strong mercury arc light is sensed by sensor 24, a signal is sent to filter selector 82 which will position the polarizing filter 26 of Figure 1 before the driver's eyes. When white light from an incandescent headlamp is received by sensor 24, a signal is sent to selector 80 to position the monochromatic interference filter before the driver's eyes. When either signal is received by sensor 24, a signal is sent to beam dip control 83 which causes the beam in mercury lamp 22 to be "dimmed" or dipped toward the pavement in conjunction with either the transformer or relay systems shown in Figures 4 through 4b. Manual switch 84, which may be located on the dash panel, when in the position shown will operate only incandescent lamps 23 which would be desired for town driving.

Since the characteristics of a mercury arc lamp are different from those of an incandescent lamp, special provisions are required to make a mercury arc satisfactory as a motor vehicle headlamp. Such special provisions are incorporated into the electrical system and are arranged for fully automatic operation.

COLD STARTING

When switch 84 is placed in its upper position, a circuit is completed between generator 31, through transformer 86, resistor 87, and mercury arc tube 22, and back to the generator via ground at 88. Since little or no current flows in this circuit until an arc is established, the voltage across arc tube 22 is substantially that applied by generator 31 and transformer 86. This voltage is sufficient to strike an arc in arc tube 22 when it is at the temperature of the ambient air, whereupon a current immediately flows through the aforesaid circuit. Since the impedance of the arc tube 22 on starting is lower than when it is at operating temperature, the voltage across tube 22 drops to a value well below normal. This voltage is insufficient to activate coil 91, and normally-closed switch 93 is closed thereby short circuiting resistance 87. The voltage across 85 (which is here shown as a coil on transformer 86 but may be any current-regulating device) falls to a low value. Under normal operating conditions the current through resistor 87 produces a potential across the terminals of coil 85 which potential serves to adjust the value of variable resistor 89 via switching arm 81 to regulate the current in lamp 22 to its normal value. During cold starting it is desirable to have the current in lamp 22 larger than normal to facilitate rapid warming up of the lamp. Since resistor 87 is short-circuited as described, the potential across 85 is lower than normal and reduces the value of resistor 89 to its minimum value thereby increasing the current flow in the circuit. At the same time a second set of normally closed contacts 90 governed by coil 93 close, completing a circuit through incandescent lamps 23, providing light during the warming up of mercury arcs 22. When arcs 22 approach normal operating conditions, the voltage across their terminals approaches normal value; and at a chosen voltage just below normal operating voltage at said arcs, coil 91 is sufficiently energized to open said contacts 93, extinguishing incandescent lamps 23 and removing the short-circuit from resistor 87. The voltage across current regulator 85 now corresponds to that required for normal current through lamps 22 when properly regulated by regulator 85.

HOT RESTARTING

In the event that arc lamps 22 become momentarily extinguished, as by transferring the arc from electrode 56 to electrode 61 of Figure 4a, while generator 31 continues to operate, then the voltage across lamps 22 rises to the value which would be sufficient to start them if cold. But because the pressure of mercury vapor in the hot lamps is too great to permit the striking of an arc by such voltage, the voltage persists long enough to energize coil 92 closing contacts 94 and energizing vibrator 95. Vibrator 95 causes pulses of current to flow through the primary winding of high tension coil 96, thereby applying pulses of several thousand volts between restarting electrode 54 of Figure 4 (or 63 of Figure 4a) and arc electrode 49 of Fig. 4 (or 62 of Figure 4a). These high voltage pulses are sufficient to ionize a portion of the mercury vapor in arc lamp 22 and cause the arc to restrike between electrodes 49 of Figure 4 (or 56 and 62 or alternatively 61 and 62 of Figure 4a). On restriking the arc the voltage across arc lamp 22 returns to its normal value, which is insufficient to cause coil 92 to hold switch 94 in a closed position, and the restarting voltage pulses cease. It is possible that the high voltage restarting pulses can be taken from the distributor of a conventional automobile engine ignition system. In this case switch 94 would be a gap appropriate to closing and opening a high tension circuit, and coil 96 and vibrator 95 would be omitted.

The energy to activate vibrator 95 and coil 96 are shown derived from the direct current system of the vehicle, but may alternatively be derived from the lamp circuit, for example between terminals of lamp 22.

A constant-voltage direct current source is supplied to battery 33 from generator 31 by means of the elements in rectifier 32. Alternating current is received from generator 31 by voltage regulator transformer 97, and then the voltage is passed to rectifier 98 which transforms the alternating voltage to a direct voltage. This direct voltage is applied to a tertiary current coil 99 which is wound on the core of transformer 97. As the voltage across coil 99 reaches and passes a desired level, the core in the transformer becomes biased allowing a smaller portion of the wave to pass rectifier 98, lessening the amount of energy passing from the transformer 97 to rectifier 98. When the voltage in coil 99 drops below a desired level, the direct current to the core of transformer 97 will be decreased allowing more energy to be passed. In this manner a fairly constant valued direct current voltage is received by battery 33 from generator 31 regardless of the engine speed. Generator 31 may be of the type in which at low speeds there is multiple pole operation while at high speeds all but two of the poles are eliminated or reversed thereby reducing the extremes of frequency generated at various speeds.

Figure 8:
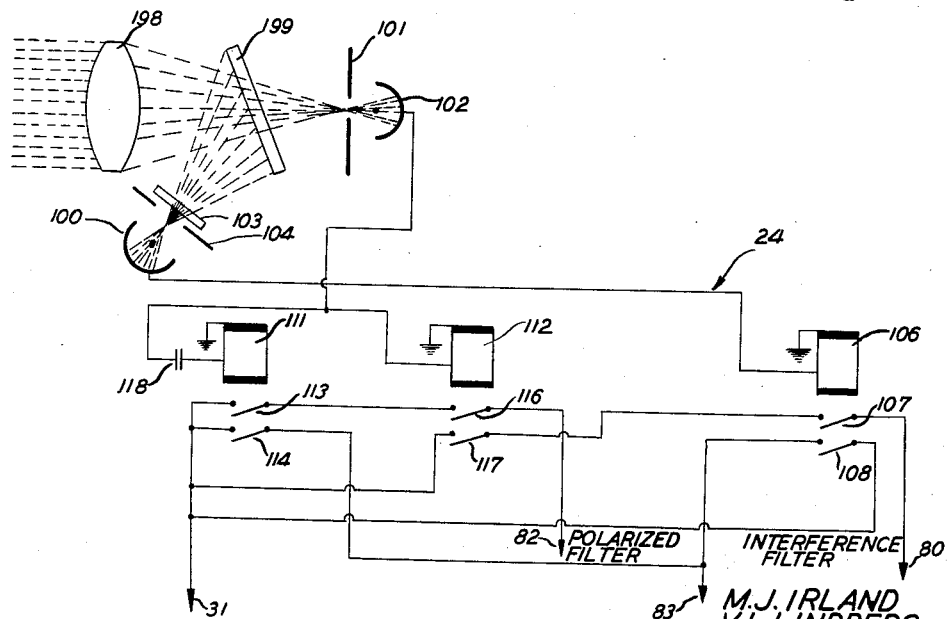
Figure 8 is a diagrammatic view showing the sensing mechanism with the beam dipping and filter selecting circuit.

In Figure 8 is shown a diagrammatic view of a possible construction for sensor 24. Collecting lens 198 is in a position to receive the light from oncoming vehicles. The light is then focused and passed through beam splitter 199 which reflects all wave lengths but those of 5461 Angstrom units downwardly to photocell 100 through filter 103 and aperture 104. Filter 103 permits only the red components of the reflected light to pass to photocell 100. Wave lengths of 5461 Angstrom units are passed through aperture 101 to photocell 102. Connected to photocell 100 is relay 106 which when energized closes switches 107 and 108 which are in respectively filter selector circuit 80 and beam dip circuit 83. Connected to photocell 102 are relays 111 and 112 which close respectively switches 113, 114 and 116, 117. Capacitor 118 permits only alternating current components to flow from photocell 102 to relay 111.

With the circuit shown in Figure 8 when light waves of 5461 Angstrom units from an alternating current source are received by lens 198, photocell 102 will be energized, energizing relay 112 and relay 111, thereby closing switches 113 and 116 completing the polarizing filter circuit to filter selector 82 and also closing switch 114 completing beam dip circuit 82. Switch 117 is closed but since relay 106 is not energized, switch 107 remains open and the interference filter is not placed before the driver's eyes. When a red component light source is received by lens 198 as from the tail lights of a vehicle being overtaken, photocell 100 is activated energizing relay 106 closing switch 108 to the beam dip circuit 83 and closing switch 107 which may energize the interference filter circuit of selector 82 if switch 117 is closed. When both fluctuating light of 5461 Angstrom units and unvarying white light from a lamp supplied from a direct current source are received by lens 198 all three relays will be energized closing the polarizing and interference filter circuits of selector 82 and also energizing beam dip circuit 83. With this arrangement when an oncoming car with a similar system is detected the polarizing filter and beam dip circuits will be energized. When an oncoming car with conventional lights is detected the interference filter circuit and beam dip circuits will be energized. When both light sources are detected indicating at least one vehicle of each system then both polarizing and interference filter and beam dip circuits are energized. When just red light is received indicating detection of only a tail light, only relay 106 will be energized closing only the beam dip circuit 83.

Figure 10:
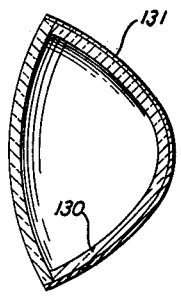

In Figure 10 is shown modified form of an absorption filter, for use in place of absorption filter 42 in Figure 2. Such a filter 130 is also didymium glass in, or coated on reflector 131. Since the light is passed through filter 130 twice, once to reflector 131 and once back, the filter need only be ½ as thick as it would be if it were placed on the lens. Also, a certain amount of unfiltered and unreflected light will be allowed to spill or to pass through the lens illuminating for a short distance a large area near the vehicle.

If it is desired to use a minimum amount of didymium glass the filter may take the form of a didymium glass sleeve or envelope around the quartz arc tube, or it may be incorporated into the quartz arc tube.

It will be understood that the invention is not to be limited to the exact construction shown and described, but that various changes and modifications may be made without departing from the spirit and scope of the invention, as defined in the appended claims.

We claim:

1. In a motor vehicle, a pair of headlamps emitting substantially monochromatic light polarized in a selected direction, a light sensor means adapted to receive light originating forwardly of the vehicle, said sensor means having filter means and light operable means associated therewith so that said sensor is capable of distinguishing between white light and light of the type emitted by said headlamps, a polarizing viewing filter in the passenger compartment of said vehicle, first relay means operable by said sensor to position said polarizing viewing filter in the line of vision of the vehicle operator when said sensor receives light of the type emitted by said headlamps, said polarizing viewing filter being oriented to pass only light polarized in said selected direction so that light from vehicles equipped with similar headlamps will be rejected and reflected light emitted from said headlamp will be transmitted, an interference viewing filter adapted to pass said substantially monochromatic light, second relay means operable by said sensor for positioning said interference viewing filter in the line of vision of the operator upon receipt of white light by said sensor.

2. In a motor vehicle, a pair of headlamps emitting substantially monochromatic light polarized in a selected direction, a light sensor means adapted to receive light originating forwardly of the vehicle, said sensor means having filter means and light operable means associated therewith so that said sensor is capable of distinguishing between white light and light of the type emitted by said headlamps, a polarizing viewing filter in the passenger compartment of said vehicle, first relay means operable by said sensor to position said polarizing viewing filter in the line of vision of the vehicle operator when said sensor receives light of the type emitted by said headlamps, said polarizing viewing filter being oriented to pass only light polarized in said selected direction so that light from vehicles equipped with similar headlamps will be rejected and reflected light emitted from said headlamp will be transmitted, an interference viewing filter adapted to pass said substantially monochromatic light, second relay means operable by said sensor for positioning said interference viewing filter in the line of vision of the operator upon receipt of white light by said sensor, and third relay means operable by said sensor to dim said headlamps when said sensor receives light from a vehicle located forward from said motor vehicle.

3. In a motor vehicle, a pair of headlamps emitting substantially monochromatic light polarized in a selected direction such that the polarized light from an approaching vehicle equipped with similar headlamps is substantially cross-polarized with respect to said light, a light sensor means adapted to receive light originating forwardly of said motor vehicle, said sensor means having filter means and light operable means associated therewith so that said sensor is capable of distinguishing between white light and light of a type emitted by said headlamps, a polarizing viewing filter in the passenger compartment of said vehicle, first relay means operable by said sensor to position said polarizing viewing filter in the line of vision of the vehicle operator when said sensor receives light of the type emitted by said headlamps, said polarizing viewing filter being oriented to pass only light polarized in said selected direction so that light from approaching vehicles equipped with similar headlamps will be rejected and reflected light emitted from the headlamps of said motor vehicle will be transmitted, an interference viewing filter adapted to pass said substantially monochromatic light, and second relay means operable by said sensor for positioning said interference viewing filter in the line of vision of the operator upon receipt of white light by said sensor.

4. In a motor vehicle, a pair of headlamps emitting substantially monochromatic light polarized in a selected direction such that the polarized light from an approaching vehicle equipped with similar headlamps is substantially cross-polarized with respect to said light, a light sensor means adapted to receive light originating forwardly of said motor vehicle, said sensor means having filter means and light operable means associated therewith so that said sensor is capable of distinguishing between white light and light of a type emitted by said headlamps, a polarizing viewing filter in the passenger compartment of said vehicle, first relay means operable by said sensor to position said polarizing viewing filter in the line of vision of the vehicle operator when said sensor receives light of the type emitted by said headlamps, said polarizing viewing filter being oriented to pass only light polarized in said selected direction so that light from approaching vehicles equipped with similar headlamps will be rejected and reflected light emitted from the headlamps of said motor vehicle will be transmitted, an interference viewing filter adapted to pass said substantially monochromatic light, second relay means operable by said sensor for positioning said interference viewing filter in the line of vision of the operator upon receipt of white light by said sensor, and third relay means operable by said sensor to dim said headlamps when said sensor receives light from a vehicle located forward from said motor vehicle.

5. In a motor vehicle, a first photo-sensitive means for producing a signal in response to electromagnetic radiation of selected frequencies, a second photo-sensitive means for producing a signal in response to electromagnetic radiation of other selected frequencies, a first filter, means connected to said first filter and said first photo-sensitive means for positioning said first filter in front of the eyes of the motor vehicle operator in response to a signal received from said first photo-sensitive means when time varying electromagnetic radiation of said selected frequencies impinges upon said first photo-sensitive means, a second filter, means connected to said second filter and said first photo-sensitive means and to said second filter and said second photo-sensitive means for positioning said second filter in front of the eyes of the motor vehicle operator in response to signals received from said first photo-sensitive means and said second photo-sensitive means.

6. In a motor vehicle, a first photo-sensitive means for producing a signal in response to electromagnetic radiation of selected frequencies, a second photo-sensitive means for producing a signal in response to electromagnetic radiation of other selected frequencies, a first filter, means connected to said first filter and said first photo-sensitive means for positioning said first filter in front of the eyes of the motor vehicle operator in response to a signal received from said first photo-sensitive means when time varying electromagnetic radiation of said selected frequencies impinges upon said first photo-sensitive means, a second filter, means connected to said second filter and said first photo-sensitve means and to said second filter and said second photo-sensitive means for positioning said second filter in front of the eyes of the motor vehicle operator in response to signals received from said first photo-sensitive means and said second photo-sensitive means, a pair of headlamps, means connected to said headlamps and said first and second photo-sensitive means for dimming said headlamps in response to a signal received from either said first or said second photo-sensitive means.

7. In a motor vehicle, a set of vehicle headlamps emitting light having a characteristic different from that emitted by conventional headlamps, a light sensor means adapted to receive light originating forwardly of the vehicle, said sensor means including means for distinguishing between the type of light emitted from said vehicle headlamps and the type of light emitted by conventional headlamps, first filter means positioned in the passenger compartment for reducing glare from an oncoming vehicle having headlamps emitting the type of light emitted from said vehicle headlamps, means connected to said sensor means and said first filter means for positioning said filter means in the line of vision of the vehicle operator when said sensor receives light of the type emitted by said vehicle headlamps, second filter means positioned in the passenger compartment for reducing glare from an oncoming vehicle equipped with conventional headlamps, means connected to said sensor means and said second filter means for positioning said second filter means in the line of vision of the vehicle operator when said sensor receives light of the type emitted by conventional headlamps.

8. In a motor vehicle, a set of vehicle headlamps emitting light having a characteristic different from that emitted by conventional headlamps, a light sensor means adapted to receive light originating forwardly of the vehicle, said sensor means including means for distinguishing between the type of light emitted from said vehicle headlamps and the type of light emitted by conventional headlamps, first filter means positioned in the passenger compartment for reducing glare from an oncoming vehicle having headlamps emitting the type of light emitted from said vehicle headlamps, means connected to said sensor means and said first filter means for positioning said first filter means in the line of vision of the vehicle operator when said sensor receives light of the type emitted by said vehicle headlamps, second filter means positioned in the passenger compartment for reducing glare from an oncoming vehicle equipped with conventional headlamps, means connected to said sensor means and said second filter means for positioning said second filter means in the line of vision of the vehicle operator when said sensor receives light of the type emitted by said conventional headlamps, and means operable by said sensor to dim said headlamps when said sensor receives light from a vehicle located forward from said motor vehicle.

References Cited in the file of this patent

UNITED STATES PATENTS

| | | |
|---|---|---|
| 837,277 | Birkeland | Dec. 4, 1906 |
| 1,029,122 | Heroult | June 11, 1912 |
| 1,112,361 | Dake | Sept. 29, 1914 |
| 1,279,990 | Comstoch | Sept. 24, 1918 |
| 1,971,941 | Pirani | Aug. 28, 1934 |
| 1,999,527 | Ronning | Apr. 30, 1935 |
| 2,152,832 | Bovey | Apr. 4, 1939 |
| 2,362,172 | Swanson | Nov. 7, 1944 |
| 2,362,174 | Swanson | Nov. 7, 1944 |
| 2,607,906 | Lang | Aug. 19, 1952 |
| 2,827,594 | Rabinow | Mar. 8, 1958 |

FOREIGN PATENTS

| | | |
|---|---|---|
| 917,789 | France | Jan. 21, 1947 |